Aug. 29, 1967  C. D. FISHER  3,338,559
APPARATUS FOR MIXING PARTICULATE MATERIALS
Filed Jan. 27, 1966  8 Sheets-Sheet 1

INVENTOR:
CHESTER DONALD FISHER
BY Howson & Howson
ATTYS.

Aug. 29, 1967    C. D. FISHER    3,338,559
APPARATUS FOR MIXING PARTICULATE MATERIALS
Filed Jan. 27, 1966    8 Sheets-Sheet 2

INVENTOR:
CHESTER DONALD FISHER
BY Howson & Howson
ATTYS.

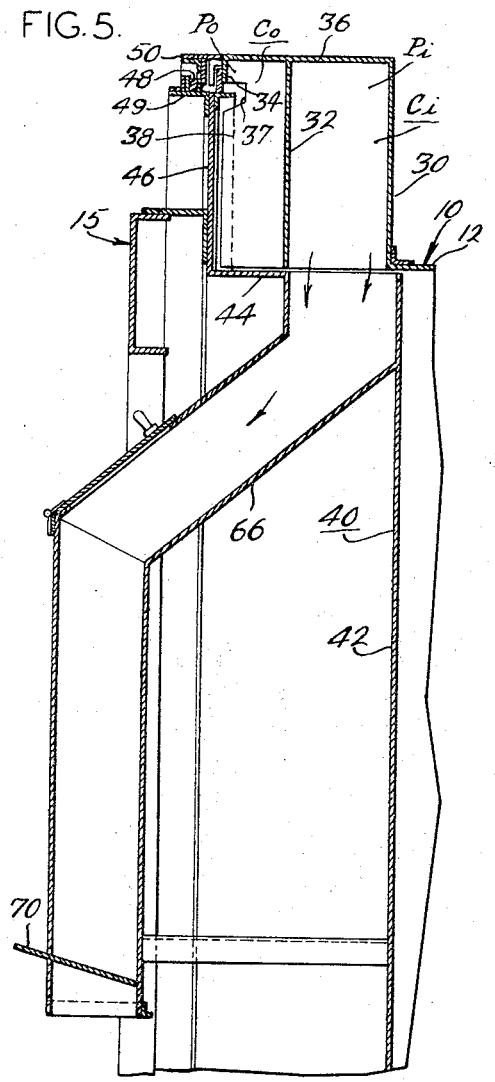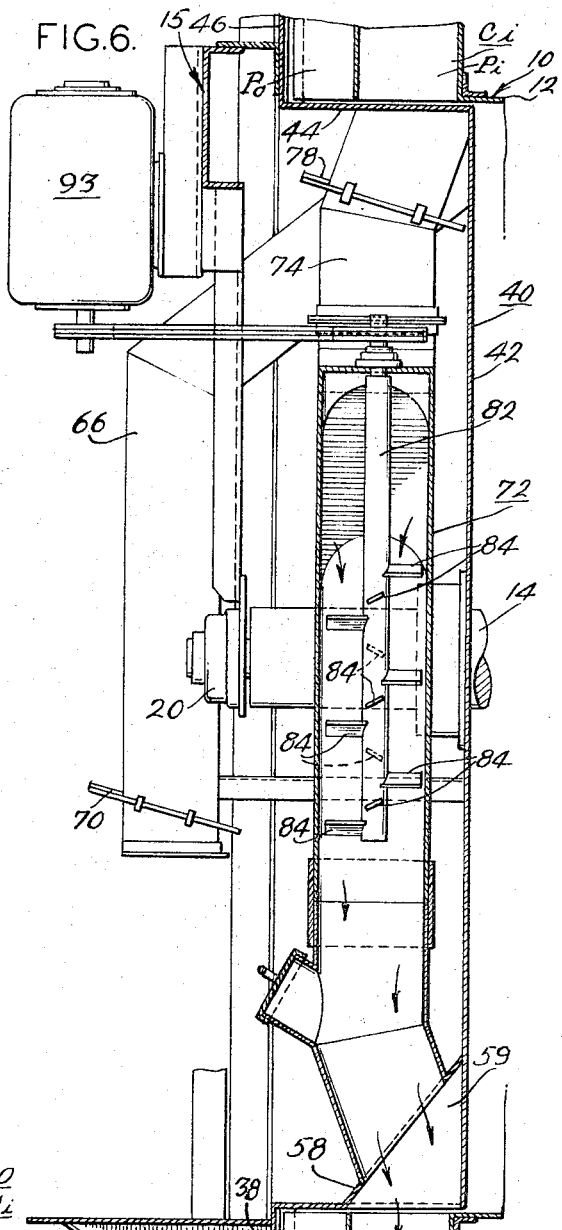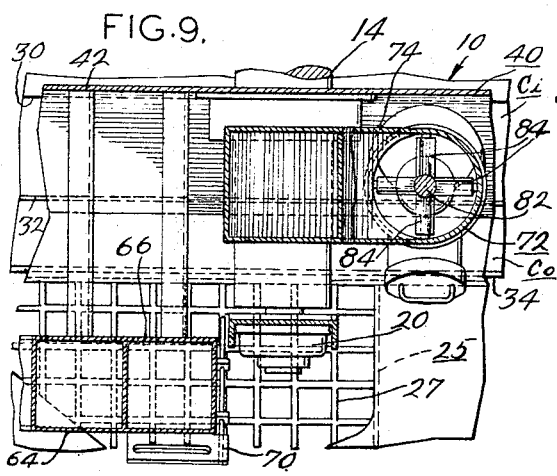

INVENTOR:
CHESTER DONALD FISHER
BY Howson & Howson
ATTYS.

Aug. 29, 1967 C. D. FISHER 3,338,559
APPARATUS FOR MIXING PARTICULATE MATERIALS
Filed Jan. 27, 1966 8 Sheets-Sheet 6
FIG. 4.b.
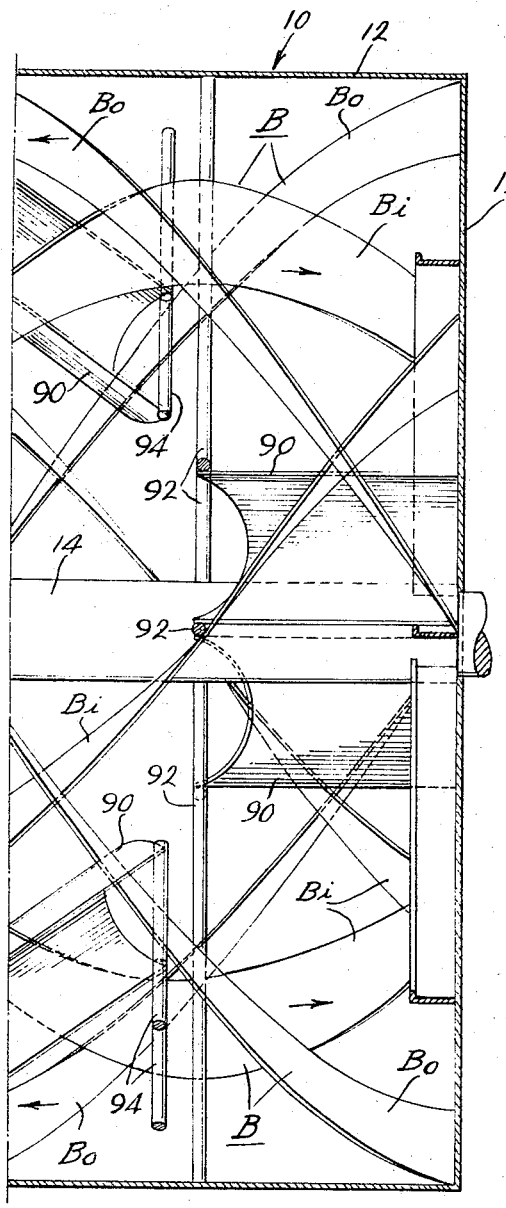
FIG. 11.
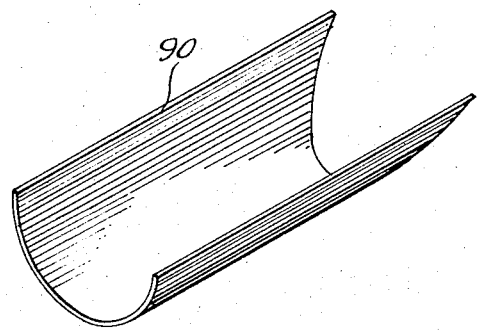
FIG. 12.
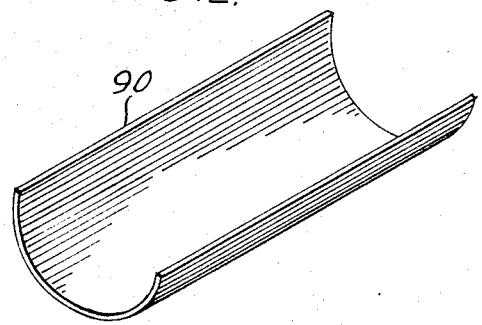
INVENTOR:
CHESTER DONALD FISHER
BY Howson & Howson
ATTYS.

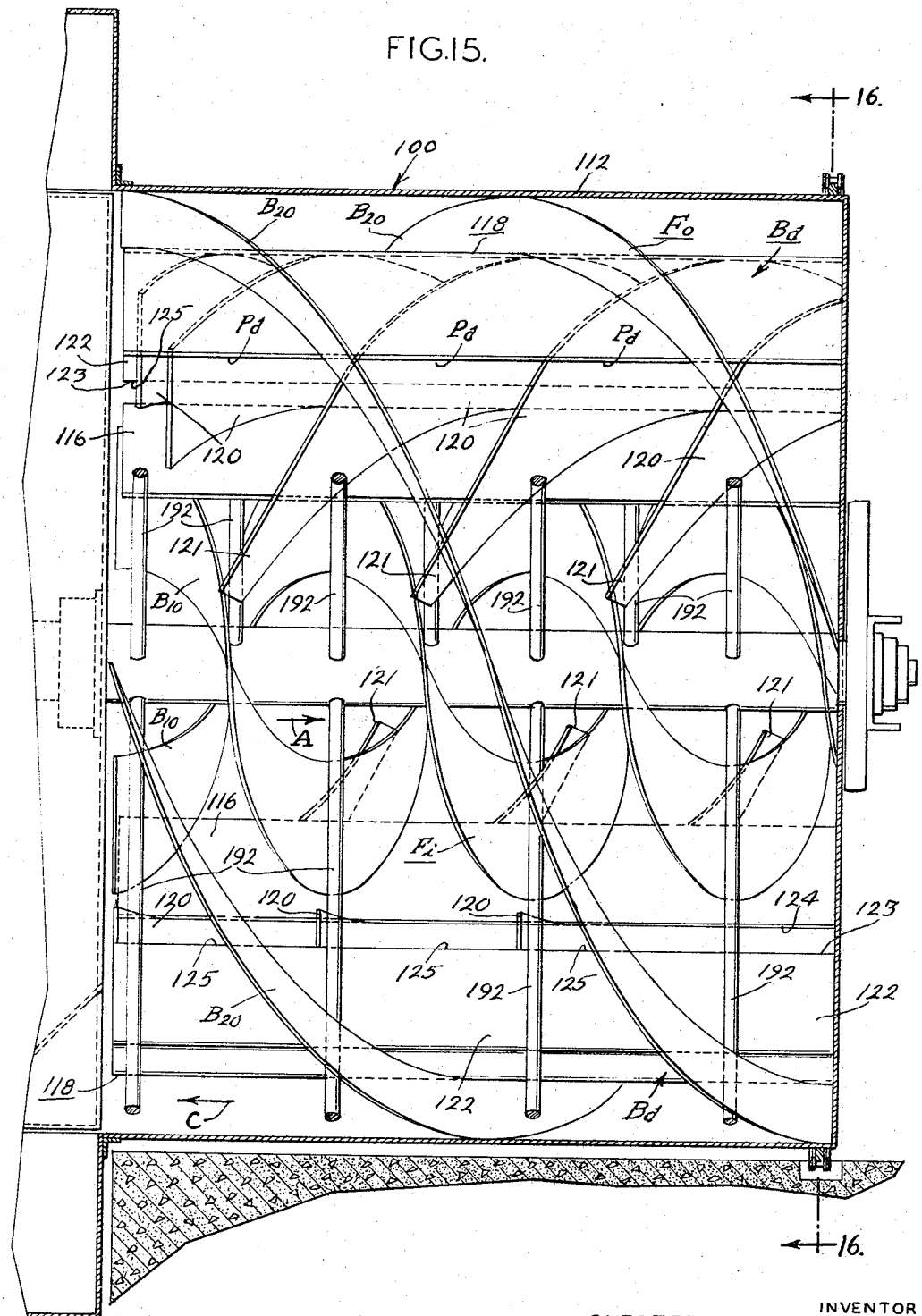

Aug. 29, 1967    C. D. FISHER    3,338,559
APPARATUS FOR MIXING PARTICULATE MATERIALS
Filed Jan. 27, 1966    8 Sheets-Sheet 8

INVENTOR:
CHESTER DONALD FISHER
Howson & Howson
ATTYS.

# United States Patent Office 3,338,559
Patented Aug. 29, 1967

3,338,559
APPARATUS FOR MIXING PARTICULATE
MATERIALS
Chester Donald Fisher, Muncy, Pa., assignor to Sprout, Waldron & Company, Inc., Muncy, Pa., a corporation of Pennsylvania
Filed Jan. 27, 1966, Ser. No. 525,820
14 Claims. (Cl. 259—3)

This is a continuation-in-part application of my prior United States application Ser. No. 441,445, filed Mar. 22, 1965, entitled "Apparatus for Mixing Particulate Materials."

The present invention relates to improvements in appartus for mixing or blending particulate materials and more particularly to improvements in rotary drum type apparatus for blending or mixing livestock feeds.

The present invention relates to apparatus for mixing or blending livestock feeds either in a dry or moist condition. These livestock feeds generally comprise a prime ingredient such as corn, wheat or barley and one or more additives, for example, soyabean meal, alfalfa meal and others. In some instances, for example, feed for dairy livestock, a liquid additive such as molasses is added to the mixture.

Some prior mixers used for mixing particulate materials for livestock feeds comprise a large cylindrical drum mounted to revolve about a horizontal axis having a plurality of pivotally mounted buckets at one end of the interior of the drum adapted to scoop material from a loading hopper at floor level exteriorly of the drum and convey the material to the top of the drum at which point the material is discharged through a pivotal trap door on the compartment housing for mixing inside the drum.

This type of rotary mixer has several disadvantages or drawbacks. For example, the mixer is of a comparatively complex construction comprised of many moving parts such as the hinged buckets and pivotal trap doors. Accordingly, it is expensive to manufacture and assemble. Furthermore, these hinged buckets and trap doors present a wear and maintenance problem in addition to being noisy in operation as they pivot and displace from one position to another inside of the metal drum. It has been found in some instances that the buckets and doors tend to jam thereby requiring disassembly of the drum and repair or replacement of parts. This, of course, results in high maintenance costs and periodic shutdown of the unit which may also be costly. Also in the operation of the drum, as the ingredients discharge into the buckets at the bottom of the drum, there is displacement of air and consequently, the ingredients being dumped into the hopper are met by a blast of displaced air which makes the charging hopper a rather dusty location presenting a nuisance to the people in the vicinity of the unit. It has further been found that these mixers operate most efficiently when one-quarter to one-half full. When loaded above this capacity, the ingredients tend to tumble more in the mixer and the endwise movement of the mixed material toward the discharge end is limited, with the result that the mixing action is comparatively slow.

The present invention provides a rotary type mixer which is comparatively simplified in construction and effectively overcomes the disadvantages and drawbacks of prior rotary type mixers especially of the type discussed above. To this end, the mixer of the present invention is provided with a pair of fixed side by side annular elevating chambers, each chamber being divided by a plurality of circumferentially spaced baffles into a plurality of compartments. The elevating chambers are disposed radially outwardly of the cylindrical side wall of the drum at one end thereof having an open side facing radially inwardly.

The mixer further includes a stationary end closure at said one end of the drum which is so disposed relative to the annular chambers to define inlet and outlet passages to facilitate loading, discharge and circulation of material through the elevating chambers. This arrangement is much simpler in construction than the mixer discussed above having the pivotally mounted buckets and trap doors and hence, is more economical to manufacture. Furthermore, by eliminating the pivotally mounted buckets and doors, the mixer of the present invention is not as noisy in operation and requires less maintenance and repair. Moreover by providing separate elevating chambers, there is a less dusty atmosphere at the load-in point.

With the foregoing in mind, an object of the present invention is to provide a rotary mixer for mixing particulate materials such as livestock feeds which is of comparatively simplified construction, is economical to manufacture, and requires a minimum amount of maintenance.

A further object of the present invention is to provide a rotary mixer which is characterized by novel features of construction including a novel arrangement of side by side compartmented annular elevating chambers at one end of the drum which serve to convey material to be mixed through the mixer.

A further object of the present invention is to provide a rotary type mixer for blending livestock feeds which is characterized by novel features of construction and arrangement including an arrangement of diverters interiorly of the drum which serve to effect faster moving and mixing of the material through the drum thereby increasing the mixing capacity to the mixer so that it may be run effectively and efficiently at three-quarter load or better.

These and other objects of the present invention and the various features and details of the operation and construction thereof are hereinafter more fully set forth with reference to the accompanying drawings, wherein:

FIG. 4b is an enlarged sectional view of the rear half of the mixer;

Figure 1:
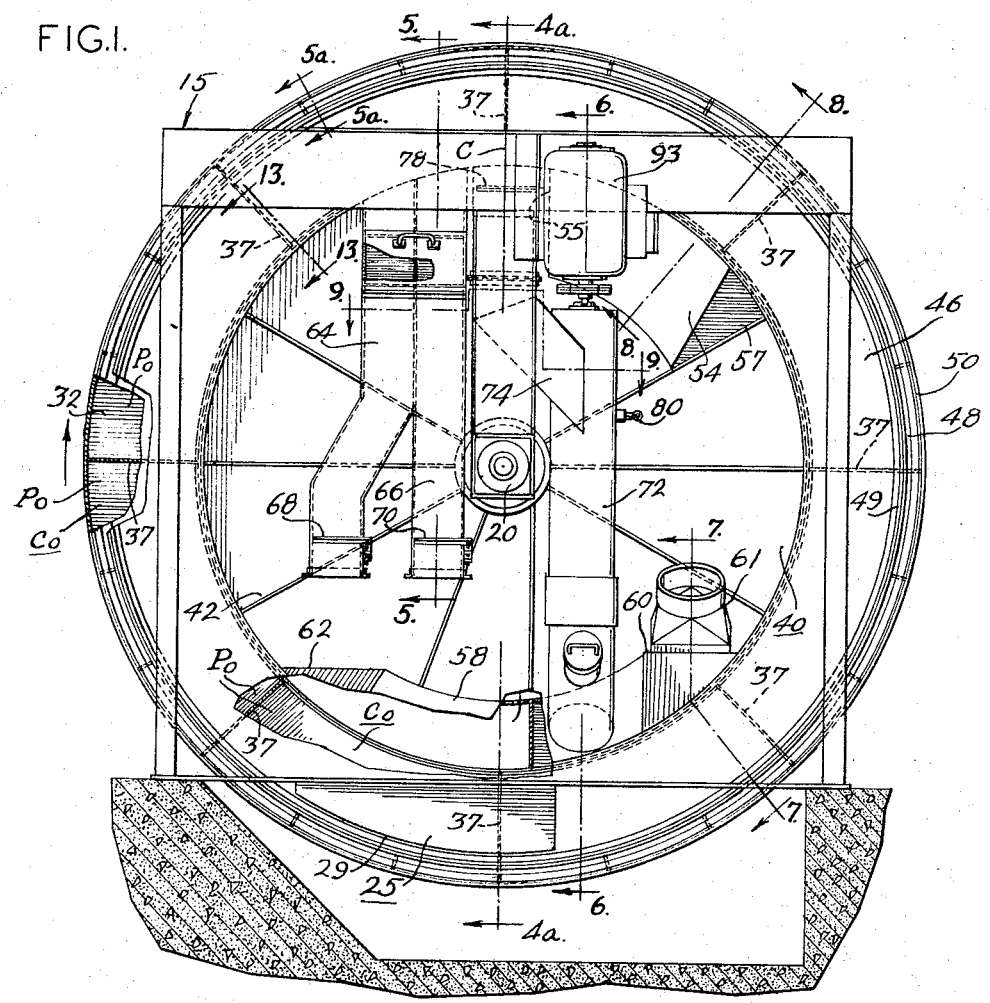
FIG. 1 is a front view with parts broken away of a rotary mixer in accordance with the present invention.
Figure 5A:
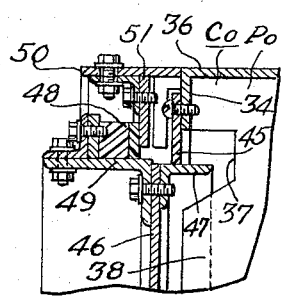
Figure 7:
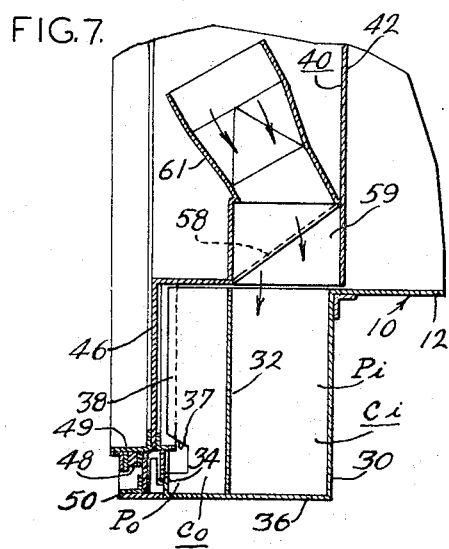
Figure 8:
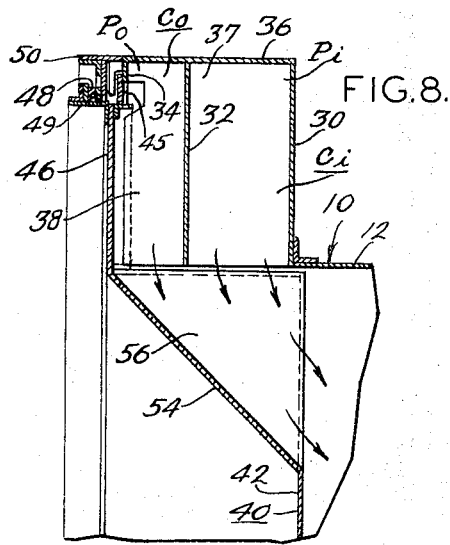
Figure 4A:
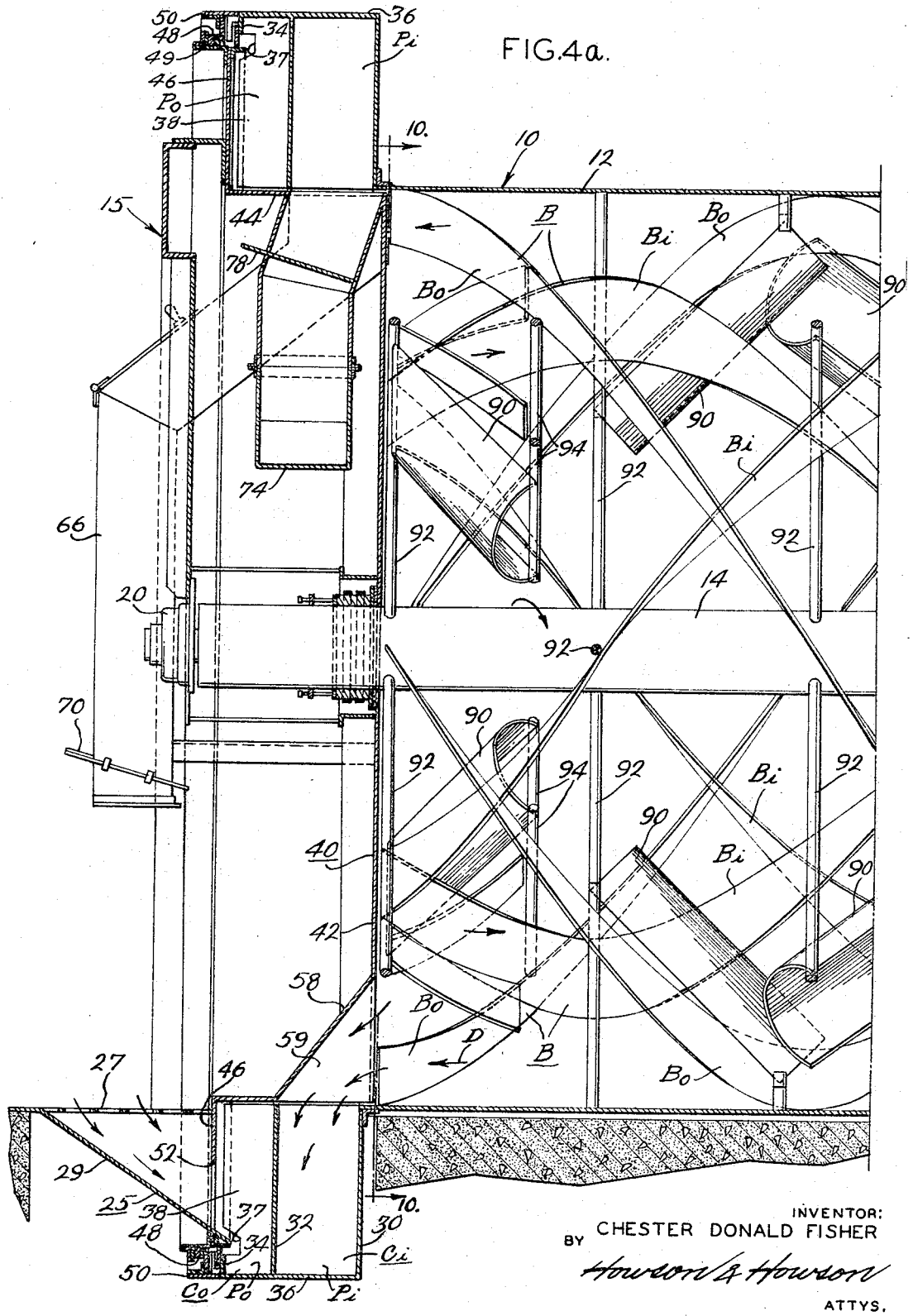
FIG. 4a is an enlarged sectional view of the front half of the mixer taken on line 4a—4a of FIG. 1.
Figure 10:
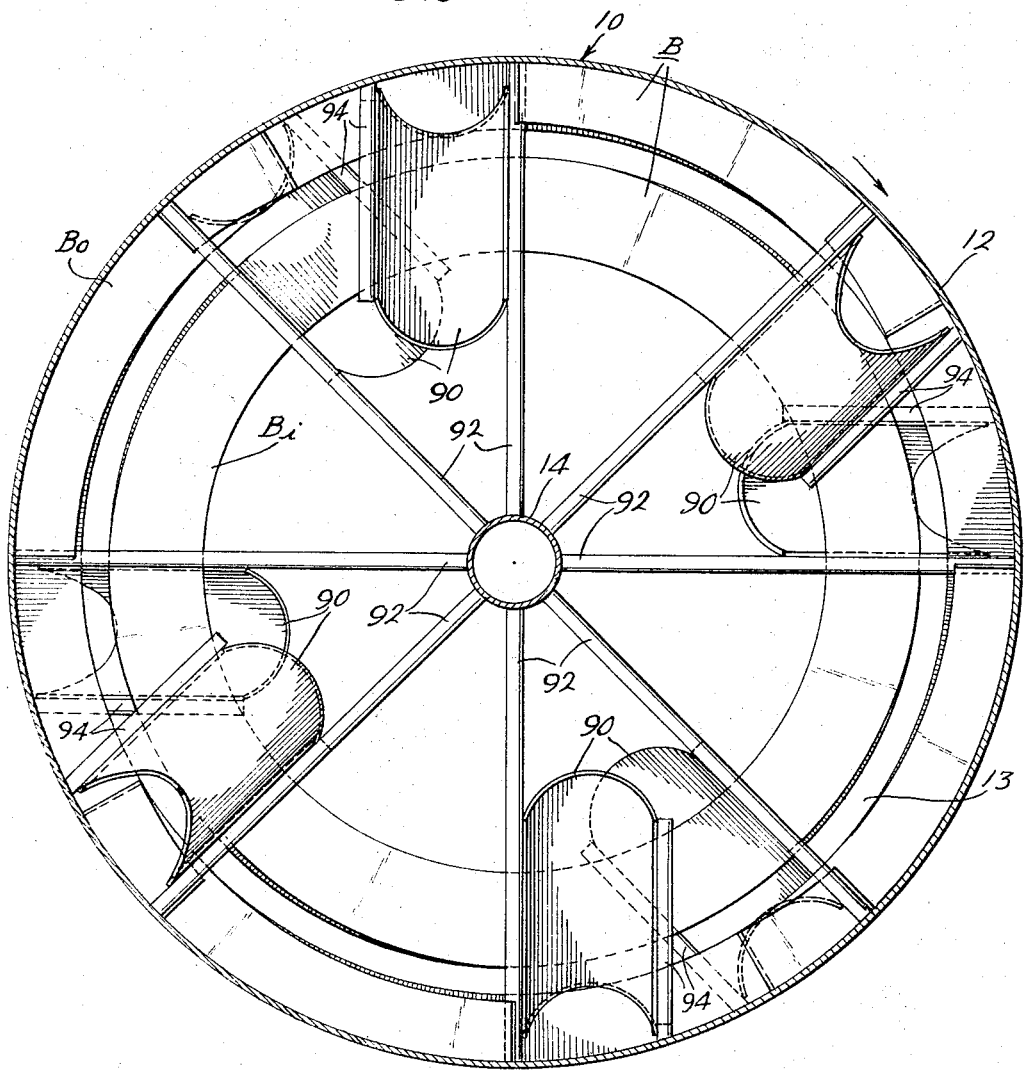
Figure 13:
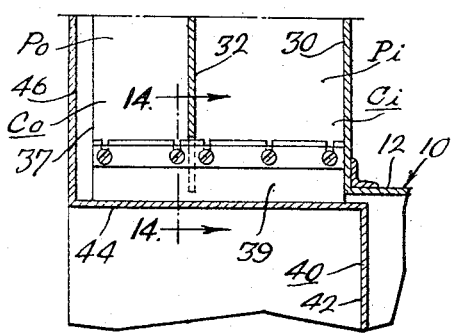
Figure 14:
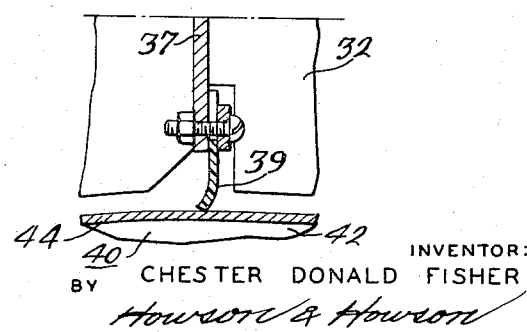
Figure 16:
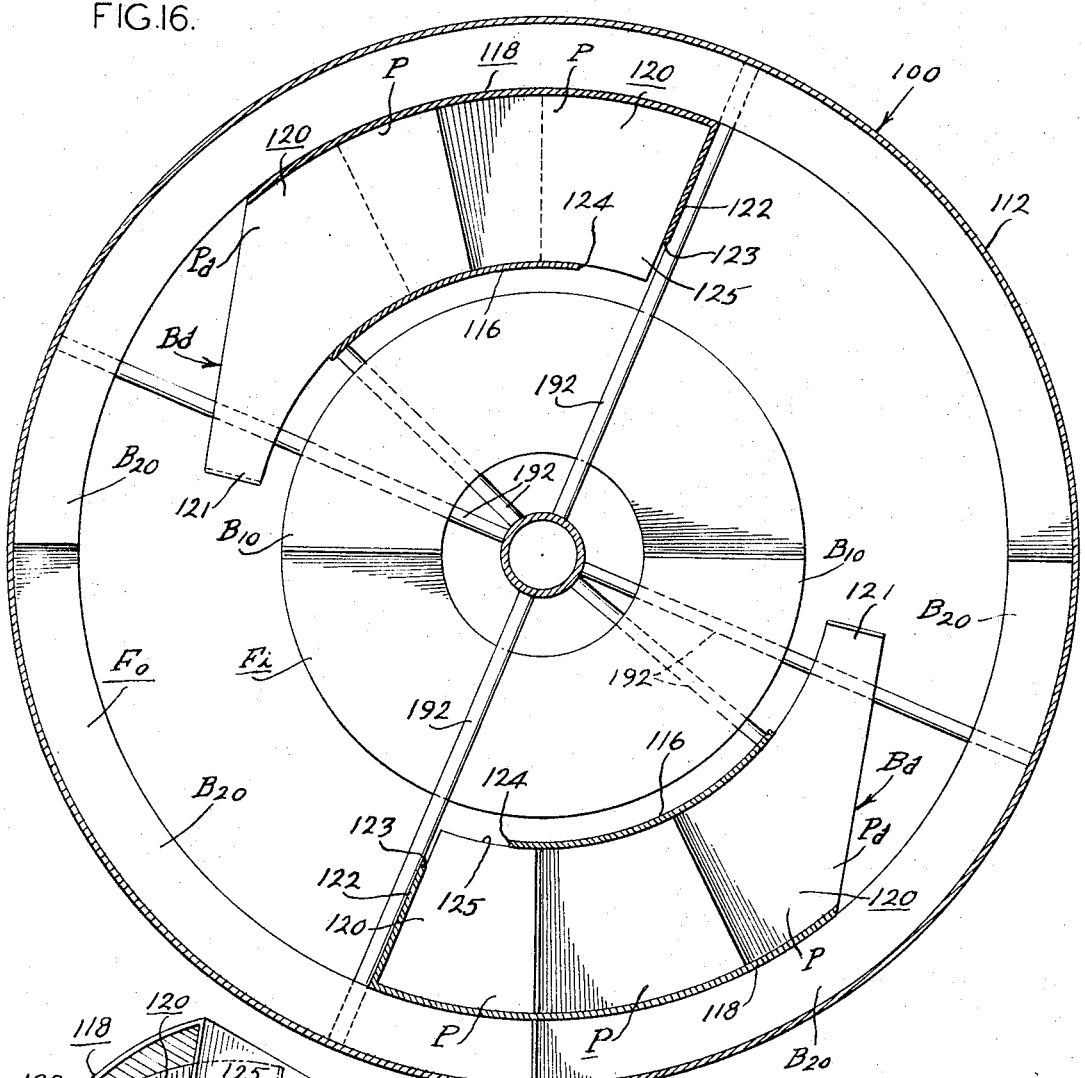

FIGS. 5, 5a and 6 are enlarged sectional views taken on lines 5—5, 5a—5a and 6—6 of FIG. 1;

FIG. 7 is an enlarged fragmentary sectional view taken on line 7—7 of FIG. 1;

FIG. 8 is an enlarged fragmentary sectional view taken on line 8—8 of FIG. 1;

FIG. 9 is an enlarged fragmentary sectional view taken on line 9—9 of FIG. 1;

FIG. 10 is a sectional view taken on line 10—10 of FIG. 4a;

FIGS. 11 and 12 are perspective views of the two forms of diverter chutes used in the interior of the drum;

FIG. 13 is an enlarged sectional view taken on line 13—13 of FIG. 1;

FIG. 14 is an enlarged sectional view taken on line 14—14 of FIG. 13;

FIG. 15 is an enlarged longitudinal sectional view taken through the mixer drum showing another form of diverter arrangement in accordance with the present invention;

FIG. 16 is an enlarged sectional view taken on lines 16—16 of FIG. 15; and

Figure 17:
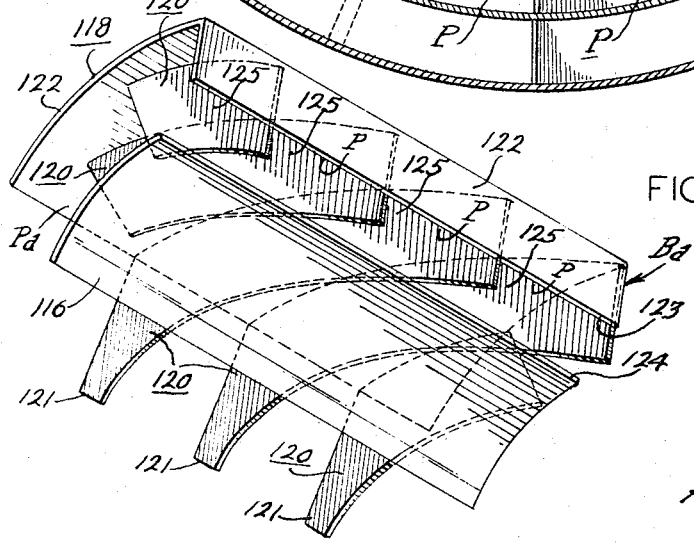

FIG. 17 is a fragmentary perspective view of the bucket diverters.

Figure 3:
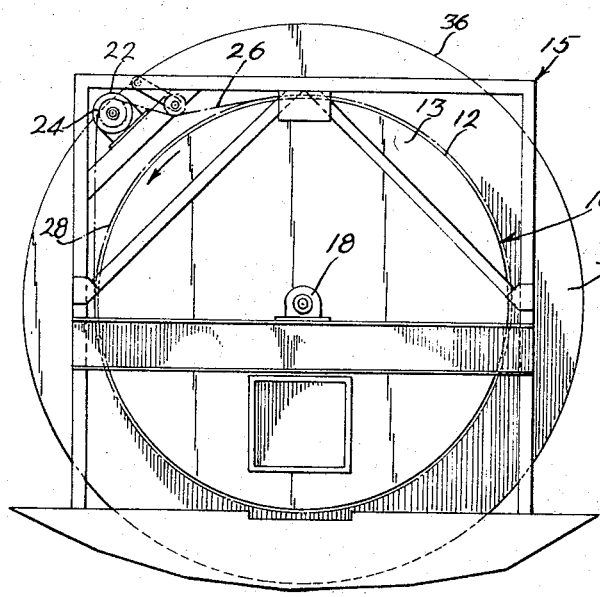
FIG. 3 is an end view of the rotary mixer of the present invention.
Figure 2:
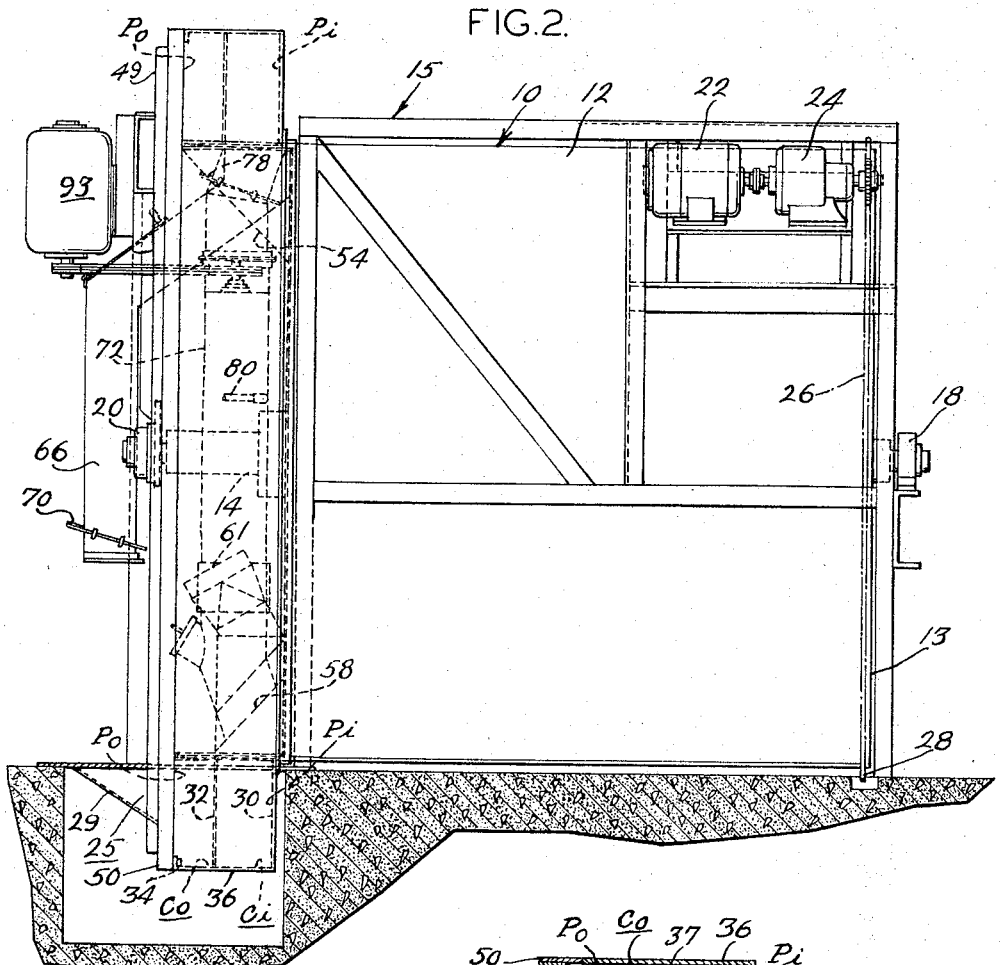
FIG. 2 is a side elevational view of the mixer shown in FIG. 1.

Referring now to the drawings and particularly to FIGS. 1–3 thereof, there is shown a rotary type mixer in accordance with the present invention comprising a large cylindrical drum 10 having a cylindrical side wall 12 and a rear end wall 13. The drum is carried in a frame structure 15 for rotation on an axially extending shaft 14 mounted centrally of the drum by a plurality of radially extending rod-like ribs 92, the terminal ends of the shaft 14 being journalled in bearings 18 and 20 mounted on the frame structure 15 at opposite axial ends of the drum. Suitable drive means is provided for rotating the drum about its central axis comprising in the present instance a motor 22 operatively connected through a speed reducer 24 and a sprocket chain 26 to a ring sprocket 28 on the outer periphery of the cylindrical side wall 12 of the drum.

The ingredients to be mixed enter the mixer at ground level. Some of the ingredients enter the mixer through a loading hopper 25 defined by a horizontal foraminous grate 27 which, as illustrated in FIG. 4a, is at ground lever and an arcuate bottom wall 29.

In accordance with the present invention, the mixer is characterized by a novel arrangement for introducing the ingredients to be mixed into the mixer and effecting discharge of the mixed material. To this end there are provided side by side annular elevating chambers, an inner chamber $C_i$ and an outer chamber $C_o$ which, in the present instance, are disposed radially outwardly of the cylindrical side wall 12 of the drum at the forward end thereof, and which as illustrated, have a circumferentially extending open side facing radially inwardly.

In the present instance the sides of the inner annular elevating chamber $C_i$ are defined by a pair of radially outwardly projecting, axially spaced walls 30 and 32, the wall 32 also defining a side of the outer elevating chamber $C_o$. As illustrated, an outer cylindrical shell 36 spans the axial walls 30 and 32 to form the outer closure for the inner elevating chamber $C_i$, the shell 36 projecting forwardly of the wall 32 to form the outer closure for the outer chamber $C_o$. A short radial wall 34 projects radially inwardly from the forward edge of the shell 36 to define a front opening 38 in the outer chamber $C_o$ to facilitate passage of material from the loading hopper 25 into the outer chamber $C_o$ at the loading point. The inner and outer chambers $C_i$ and $C_o$ are divided into a plurality of inner and outer compartments $P_i$ and $P_o$ respectively by a plurality of circumferentially spaced, axially extending spacers or baffles 37 spanning the inner and outer chambers.

The front end of the mixer is closed by means of a stationary front enclosure 40 which comprises a generally circular disc 42 confronting and closing the front end of the drum 10 and spaced axially inwardly of the elevating chambers $C_i$ and $C_o$ and an axial wall extension 44 which projects forwardly from the circular disc 42 and confronts and overlies the inner open side of the elevating chambers. The stationary front enclosure 40 further includes a radially outwardly projecting circumferentially extending flange 46 which overlies the front opening 38 of the outer chamber $C_o$. The flange 46 has an entrance port 52 at its lower extremity at the loading point to permit material to enter the outer elevating chambers $C_o$ from the loading hopper 25.

A sealing arrangement is provided adjacent the outer periphery of the outer elevating chamber $C_o$ to prevent dust and material from escaping from the elevating chambers during operation of the mixer. The sealing arrangement as best illustrated in FIG. 5a comprises an annular inner seal 45 projecting radially inwardly from the wall 34 which engages along its inner peripheral edge an angle ring 47 mounted on the inner face of the flange 46. There is also provided an outer seal defined by a circumferentially extending locating ring 50 projecting axially outwardly from the wall 34, which mounts a radially inwardly projecting annular sealing plate 51 which engages a second annular resilient sealing member 48 carried by a circumferentially extending plate 49 projecting forwardly from the outer peripheral edge of the flange 46. As best illustrated in FIGS. 13 and 14, each of the baffles 37 mounts a depending wiper blade 39 which engages the axial wall extension 44 of the front enclosure 40.

The stationary front enclosure 40 is spaced from the open side of the elevating compartments at predetermined selected locations to define arcuate passages providing communication between the elevating compartments and the interior of the drum facilitating circulation of materials to be mixed through the drum.

More particularly, the stationary front enclosure 40 has a slanted baffle section 54 in the upper right-hand quadrant thereof as best illustrated in FIG. 1, which diverges outwardly from the central circular disc 42 to the radial flange 46 thereof to define an inlet chute or passageway 56 (see also FIG. 8). The baffle section 54 extends circumferentially from a point 55 to the right of vertical center line C of the mixer to a point 57 approximately in a plane radial to the center line of the mixer. By this arrangement, as the loaded compartments reach the top of the mixer, material discharges by gravity from the compartments through the inlet passageway into the interior of the drum. The front enclosure 40 is also provided with another slanted baffle section 58 which extends circumferentially between the points 60 and 62 adjacent the bottom of the mixer on either side of the loading point. This slanted wall portion 58 diverges outwardly from the central circular disc to the axial wall extension 44 as shown in FIG. 4a to define an outlet chute or passageway 59. By this arrangement, material from the drum moving toward the front end of the drum as shown by the arrows marked D in FIG. 4a may enter the inner compartments $P_i$ through the outlet passageway 59. The passageway 59 does not permit material from the drum to enter the outer compartments $P_o$. Mounted at the right-hand side of the slaned baffle 58 as at 60 is a charging spout 61 through which materials to be mixed are introduced into the inner compartments $P_i$.

The mixer further includes means for discharging the mixed material from the drum. To this end there is provided in the present instance a pair of side by side discharge chutes 64, 66 which depend from the axial wall 44 of the front enclosure 40 to the left of the vertical center line C as best illustrated in FIG. 1. The upper end of the discharge chutes communicates with the inner compartments $P_i$ of the elevating chambers as illustrated in FIG. 5. The discharge chutes 64, 66 have slide gates 68 and 70 respectively at their lower terminal ends for controlling discharge of mixed material through the chutes.

These mixers usually service farmers in a given vicinity who supply the ingredients to be mixed to the operator of the mixer. The primary ingredients such as corn, oats and wheat are usually first ground in a hammer mill and thereafter the ground ingredients are fed directly into the mixer through the charging spout 61 by means of a conduit or the like connected to the charging spout 61 of the mixer. The charging spout communicates with the inner compartment $P_i$ of the inner elevating chambers (see FIG. 7). By this arrangement, as the drum rotates in a clockwise direction with respect to FIG. 1, the primary ingredients are carried in the inner compartments $P_i$ from the loading point at floor level to the top of the drum. As the loaded compartments pass the inlet chute or passage 56 defined by the baffle section 54, the primary ingredients discharge by gravity from the compartments into the interior of the drum. As noted previously, the livestock feed includes a concentrated ingredient such as corn meal, alfalfa meal and others, which in the present instance may be deposited in the loading hopper 25 through the floor grate 27. This concentrated material enters the outer compartments $P_o$ at the loading point at the bottom of the outer compartments $P_o$ as illustrated in FIG. 4a. Now, as the drum rotates in a clockwise direction with respect to FIG. 1, the loaded outer compartments $P_o$ convey the material therein to the top of the mixer where the outer compartments $P_o$ pass the inlet chute 56 and at this point the concentrated ingredients discharge by gravity into the interior of the drum. Accordingly, by separating the elevating chambers, it is possible to have the inlet ingredients in one section of the chamber isolating it completely from the other chamber so as to preclude the possibility of air creating a dusty condition at the loading point. It is noted that during the loading operation the slide gates 68 and 70 on the discharge chutes are closed and that a small amount of the primary ingredients initially deposited at the beginning of the loading operation falls into the discharge chutes since they are located to the left or upstream of the inlet chute 56.

When the mixer has been filled to capacity in this manner, the drum is rotated for a predetermined length of time to thoroughly mix or blend the ingredients. In order to provide for effective mixing and tumbling of the ingredients in the drum, the drum is provided with a plurality of mixing blades B mounted interiorly of the drum (see FIG. 4a). These blades are in a spiral arrangement and, as illustrated, are angularly pitched. In the present instance there is an inner flight of mixing blades $B_i$ and an outer flight of mixing blades $B_o$. By this arrangement the inner flight of mixing blades $B_i$ effects movement of the material from the front end of the drum to the rear end thereof adjacent the axial center of the drum and the outer flight of mixing blades $B_o$ moves the material from the rear end of the drum to the forward end adjacent the outer periphery of the side wall 12 of the drum. Further, it is noted that during the mixing cycle, when the ingredients are moving from one end of the drum to the other in the manner noted above, the mixed ingredients are continuously flowing into the inner compartments $P_i$ through the outlet passage 59 and are continuously conveyed to the top of the drum and pass through the inlet passageway 56 to be recirculated in the drum.

After the material has been thoroughly mixed in the drum and it is desired to remove the mixed material from the mixer to be transported by the farmer to his farm, bags are placed under the open end of the discharge chutes 64 and 66 and the slide gates 68 and 70 are opened to permit flow through the chutes. Now as the drum rotates and the mixed materials are conveyed by the inner elevating compartments $P_i$ from the bottom of the drum to the top thereof and as the loaded inner compartments $P_i$ register with the discharge chutes, the mixed materials discharge therethrough into the bags. It is noted that since the discharge chutes communicate with the inner elevating compartments $P_i$ at a point upstream of the inlet chute 56, the mixed ingredients are discharged through the chutes when they are open and do not return into the drum. This process is continued until the drum has been emptied.

In mixing some feeds for dairy livestock, a liquid additive, for example, molasses is added to the primary and concentrated ingredients. The mixer of the present invention has means for mixing the molasses with the primary and concentrated ingredients. To this end there is provided a molasses mixing unit which, as best illustrated in FIG. 6, comprises a generally cylindrical housing 72 mounted forwardly of the front enclosure 40, which is connected at its lower end to the slanted baffle section 58 and communicates with the inner compartments $P_i$ of the elevating chambers and which has an elbow section 74 at its upper end communicating with the inner compartments $P_i$ at a point between the discharge chutes and the inlet passageway 56. A slide gate 78 is mounted in the elbow section to selectively control pasasge of material through the molasses mixer. A fitting 80 is mounted on the housing 72 to supply the liquid additive, for example, molasses, from a supply source to the housing 72. Mounted interiorly of the housing is a shaft 82 having a plurality of radially projecting paddles or arms 84 which serve to mix the molasses with the ingredients as they are passing through the housing 72. This shaft is rotated by suitable driving means including a motor 93 connected to the shaft by suitable sheave and belt transmission means.

Accordingly, in the operation of the unit for mixing feeds with a liquid additive such as molasses, the primary and concentrated ingredients are fed into the drum in the same manner noted above. After the ingredients have been mixed for a predetermined length of time, the slide gate 78 in the elbow conduit 74 is opened whereby the material in the inner elevating compartments $P_i$ discharge therethrough into the housing 72, where it is mixed with molasses entering the housing 72 through the fitting 80. The paddles 84 insure good mixing of the primary and concentrated ingredients with the molasses. The mixed ingredients are then discharged at the lower end of the housing and again enter the inner elevating compartments $P_i$. After all of the molasses has been added to those ingredients which have passed through the molasses mixing unit, the slide gate 78 is closed and when it is desired to discharge the final mixed product, the slide gates 68 and 70 on the discharge chutes are opened. It is noted that in mixing a feed including a molasses additive, the mixed ingredients with the molasses are conveyed only in the inner elevating compartments $P_i$ thereby maintaining the outer compartments clean. It is noted also that dry mixed ingredients entering the inner compartments from the drum through the passageway 59 mix with the ingredients from the housing 72 at the lower side of the drum thereby providing a good mixing action of all of the ingredients.

In prior mixers of this type it has been found that the mixer operates most efficiently to effect proper blending of the ingredients when one-quarter to one-half full. When loaded above this capacity the ingredients tend to tumble in the mixer whereby the end-wise movement of the mixed material toward the discharge end is limited with the result that the mixing action is comparatively slow. Another feature of the present invention is the provision of means for effecting good mixing of the materials in a manner insuring good end-wise movement of the mixed material. To this end there is provided a plurality of angularly disposed diverter chutes 90 in the interior of the drum. As illustrated in the drawings, these diverter chutes are mounted on support rods 92 and 94 so that the chutes are other than radially directed. With these diverter chutes it has been found that the mixer can be operated effectively and efficiently at three-quarter load or higher.

There is shown in FIGS. 15–17 another arrangement of diverters on the interior of the drum 100 for effecting optimum mixing of the materials. The general arrangement and structural details of the apparatus such as the forward feed section are identical in all respects to the apparatus previously described, except that the arrangement of the mixing elements on the interior of the drum is different. In the present instance the arrangement of the mixing elements interiorly of the drum is designed particularly to obtain a rapid thorough mix of materials delivered to the drum 100 particularly when an additive such as molasses has been mixed with the granular materials. In accordance with this embodiment of the invention, the mixing elements comprise central inner flights of mixing elements $F_i$ adjacent the axial center of the drum 100, an outer flight of mixing elements $F_o$ adjacent the cylindrical side wall 112 of the drum 100 and a plurality of bucket diverters $B_d$ between the inner and outer flights.

Considering now more specifically the structural arrangement of the bucket and flight diverters, the inner flight of mixing elements comprises a pair of spirally oriented, annularly pitched blades $B_{10}$ supported on radially extending rod-like ribs 192. These inner blades $B_{10}$ are disposed 180° out of phase and so pitched to convey material from the load end to the rear end of the drum 100 in the direction indicated by the arrow A. The outer flight of mixing elements comprises a plurality of spirally oriented outer blades $B_{20}$ which extend approximately 180° around the circumference of the drum 100 adjacent the outer periphery thereof and serve to convey the material in the opposite direction from the inner flight, that is, in the direction of the arrow C. In the present instance, there are two sets of bucket diverters $B_d$ which are disposed in diametrically opposed quadrants of the drum (see FIG. 15) and are disposed between the inner and outer flights $F_i$ and $F_o$ of mixing elements. Each of these bucket diverters, as illustrated in FIGS. 15 and 16, comprises an inner arcuate wall 116, an outer arcuate wall 118, and a plurality of spaced apart ribbons 120 disposed between the inner and outer arcuate walls and defining a plurality of circumferentially spaced pocket sections P which have an open discharge end $P_d$ adjacent the tail ends 121 of the ribbons 120. The ribbons 120 are disposed at an angle to a plane normal to the rotational axis of the drum. The outer arcuate wall 118 has a radially extending inwardly directed side wall 122 defining between its inner edge 123 and the adjacent edge 124 of the inner arcuate wall 116, a plurality of discharge openings 125 communicating with the pocket sections P. As best illustrated in FIG. 16, the pocket openings 125 for the opposed bucket diverters $B_d$ are diametrically opposed. In operation the pocket sections P of the bucket diverters $B_d$ load up with the material when they traverse the bottom of the mixer drum 100 and then as they move to the top, the material in the pocket sections P is discharged through the discharge end $P_d$ and the discharge openings 125. More specifically, and with reference to FIG. 16, part of the charge of material in the pocket sections P is deflected in one direction through the open discharge end $P_d$ of the pocket sections to be conveyed by the outer flight $F_o$ and part of the charge discharges through the openings 125 to the inner flight $F_i$ to be conveyed in the opposite direction in the drum. This gives the back and forward movement of the material in the mixer which is desirable for rapid interchange of the material and rapid mixing. These bucket diverters therefore, function to effect a rapid mix when the mixer is nearly full.

While particular embodiments of the present invention have been illustrated and described herein, it is not intended to limit the invention to such disclosure and changes and modifications may be made therein within the scope of the following claims.

I claim:
1. A mixer for mixing particulate materials comprising a drum having a generally cylindrical side wall and an end wall closing one end of said drum, a pair of side by side annular elevating chambers at the axial end of said drum opposite said one end, each of said chambers being divided into a plurality of compartments which have an open side facing radially inwardly, a stationary enclosure member at said opposite end of the drum having a portion confronting the open sides of the compartments of said annular elevating chambers, said portion being disposed relative to said annular chambers to define an inlet passageway through which materials in said compartments discharge into said drum from said compartments and an outlet passageway through which material in said drum flows into the compartments of one of said annular chambers.

2. A mixer as claimed in claim 1 wherein said elevating chambers are defined by an inner circumferentially extending wall projecting radially outwardly from the cylindrical side wall of the drum, an outer circumferentially extending wall projecting from said stationary enclosure member and axially spaced from said inner wall, a circumferentially extending partition spaced between the inner and outer walls and a cylindrical shell spanning the inner and outer walls at the outer peripheral edges thereof and wherein said chambers are divided into the compartments by axially directed circumferentially spaced spacers.

3. A mixer as claimed in claim 2 wherein one of said annular elevating chambers is an inner chamber and the other is an outer chamber and including a loading hopper for materials to be mixed disposed exteriorly of the drum, the hopper having a port through which materials flow, and means defining an opening in each of the compartments of the outer chamber whereby material in said loading hopper enters the compartment of said outer chamber when said opening is in registry with said port of the loading hopper.

4. A mixer as claimed in claim 1 including a plurality of mixing blades spirally oriented and angularly pitched on the interior of the drum, said mixing blades comprising an inner flight adjacent the axial center line and an outer flight disposed outwardly thereof, said blades effecting mixing of material in the drum and axial movement of the material from one end of the drum to the other.

5. A mixer as claimed in claim 4 including a plurality of diverter chutes interiorly of the drum mounted so that they extend in a non-radial direction.

6. A mixer as claimed in claim 1 wherein said stationary enclosure member comprises a generally circular disc confronting said opposite end of said drum, a circumferentially extending axial wall extension projecting forwardly from the disc at the outer periphery thereof which confronts the open side of said annular chambers, said enclosure member having a first slanted arcuate baffle diverging outwardly from the circular disc to the outer edge of said axial wall extension to define said inlet passageway and a second slanted arcuate baffle circumferentially spaced from said first baffle which diverges outwardly from said circular disc to the juncture of said chambers defining said outlet passageway.

7. A mixer as claimed in claim 6 including an inlet spout projecting from one end of said second baffle whereby material may be fed through said spout into the compartments of said one annular chamber.

8. A mixer as claimed in claim 1 including mixing blades on the interior of the drum, said mixing blades comprising an inner flight adjacent the axial center line and an outer flight and bucket diverters disposed between the inner and outer flights of mixing blades.

9. A mixer as claimed in claim 8 wherein one of the flights of mixing blades effects movement of the material in one axial direction in the drum and the other flight effects axial movement of the material in a direction opposite said one direction.

10. A mixer as claimed in claim 8 including at least one set of diametrically opposed bucket diverters, each of said bucket diverters being defined by inner and outer arcuate walls and a plurality of spaced ribbons between the arcuate walls defining a plurality of pocket sections.

11. A mixer for mixing particulate materials comprising a drum having a generally cylindrical side wall and an end wall closing one end of said drum, a pair of side by side annular elevating chambers at the axial end of said drum opposite said one end, each of said chambers being divided into a plurality of compartments which have an open side facing radially inwardly, means for introducing materials to be mixed to said compartments from exteriorly of the drum, and means for discharging mixed material from the compartments of one of said chambers, and a stationary enclosure member at said opposite end of the drum having a portion confronting the open sides of said compartments, said portion being disposed relative to said annular chambers to define an inlet passageway through which materials in said compartments discharge into said drum and an outlet passageway through which material from said drum flows into the compartments of said one annular chamber.

12. A mixer for mixing particulate materials comprising a frame mounted on a support surface, a drum mounted in said frame and adapted to be rotated about an axis substantially parallel with the supporting surface, said drum having a generally cylindrical side wall and an end wall closing one end of said drum, inner and outer annular elevating chambers at the axial end of said drum opposite said one end, each of said chambers being divided into a plurality of compartments which have an open side facing radially inwardly and means for introducing materials to be mixed to the compartments of said outer annular elevating chamber from exteriorly of the drum at one point adjacent the support surface, means for discharging mixed material from the compartments of one of said chambers at another point spaced above said support surface including a discharge chute communicating at one end with the compartments of said inner annular elevating chamber and a slide gate in said chute for regulating flow therethrough, and a stationary enclosure member at said opposite end of the drum having a portion confronting the open sides of said compartments, said portion being disposed relative to said annular chambers to define an inlet passageway through which materials in said compartments discharge into said drum and an outlet passageway through which material from said drum flows into the compartments of one of said annular chambers.

13. A mixer as claimed in claim 12 including a mixer housing communicating at one end with said inner chamber adjacent said one point end at its opposite end communicating with said inner chamber adjacent said other point, means for selectively regulating flow of material through said housing and means for introducing a liquid additive to said material in said mixer housing.

14. A mixer as claimed in claim 13 including a rotatable shaft having a plurality of radial paddles in said mixer housing to mix said materials with said liquid additive therein.

References Cited

UNITED STATES PATENTS

| | | | |
|---|---|---|---|
| 3,194,538 | 7/1965 | Murray | 259—3 |
| 3,259,372 | 7/1966 | Phillips | 259—3 |

WILLIAM I. PRICE, *Primary Examiner.*

IRVING BUNEVICH, WALTER A. SCHEEL,
*Examiners.*

J. M. BELL, *Assistant Examiner.*